United States Patent
Kotzey

(10) Patent No.: US 6,797,107 B1
(45) Date of Patent: Sep. 28, 2004

(54) SOLID CYANOACRYLATE ADHESIVE COMPOSITION AND METHOD FOR ITS USE

(75) Inventor: Dimiter L. Kotzey, Northants (GB)

(73) Assignee: Chemence, Inc., Alpharetta, GA (US)

( * ) Notice: Subject to any disclaimer, the term of this patent is extended or adjusted under 35 U.S.C. 154(b) by 0 days.

(21) Appl. No.: 10/428,696

(22) Filed: May 2, 2003

Related U.S. Application Data

(63) Continuation of application No. 09/895,931, filed on Jun. 29, 2001, now abandoned.

(51) Int. Cl.[7] .................................................. C09J 4/04
(52) U.S. Cl. ................................. 156/331.1; 156/331.2; 156/331.6; 156/331.8; 524/314; 524/367; 524/599; 525/186; 525/412
(58) Field of Search ............................... 525/412, 186; 524/314, 367, 599; 156/331.1, 331.2, 331.6, 331.8

(56) References Cited

U.S. PATENT DOCUMENTS 6,103,778 A  *  8/2000  Hyon et al. ................. 523/111

* cited by examiner

*Primary Examiner*—Patricia A. Short
(74) *Attorney, Agent, or Firm*—Smith, Gambrell & Russell, LLP

(57) ABSTRACT

A solid cyanoacrylate adhesive composition is disclosed which can be applied to a substrate in solid form and which polymerizes into an adhesive polymer upon liquefying. Preferably the solid cyanoacrylate composition liquefies at temperatures slightly above room temperature and polymerizes upon liquification. ε-caprolactones are used as a solidifying polymer with cyanoacrylate monomers and other additives to form the solid cyanoacrylate adhesive composition. The solid cyanoacrylate adhesive composition is easy to apply, especially stable in solid form and is capable of use in a variety of industrial, consumer and medical applications.

20 Claims, No Drawings

SOLID CYANOACRYLATE ADHESIVE COMPOSITION AND METHOD FOR ITS USE

This is a continuation-application of prior patent application Ser. No. 09/895,931, filed Jun. 29, 2001 is abandoned.

FIELD OF THE INVENTION

This invention relates to cyanoacrylate adhesives, and more particularly to cyanoacrylate adhesives which are solid at room temperature and are able to liquefy at higher than room temperature and to polymerize to form adhesive bonds or adhesive coatings. The adhesive compositions are in a form, which is particularly easy to be applied in industrial or consumer applications, as well to skin or living tissue. The adhesives are useful in bonding or coating of metals, plastics, wood, rubbers, composite materials, and living tissue. They are also useful in medical applications, including but not limited to, wound and surgical incision closure, medical device fixation, sealants and void fillers, embolic agents and other general medical applications. The invention also relates to the method of obtaining the solid cyanoacrylate compositions and to the method of delivering a solid cyanoacrylate adhesive composition to one or more substrates by the means of a suitable dispenser, joining two or more substrates together and bringing the them to a temperature above room temperature, if the substrates are not already at a temperature above room temperature, which transforms the adhesive into a liquid form, whereby the adhesive polymerizes to form a strong adhesive bond. The invention further relates to the method of delivering a solid cyanoacrylate adhesive composition by means of a suitable dispenser to a substrate where the solid adhesive transforms itself into a viscous liquid under the influence of the temperature of the substrate and polymerizes to form a coating. The invention also relates to suitable dispensers for solid cyanoacrylate adhesives.

BACKGROUND OF THE INVENTION

Liquid cyanoacrylate compositions have long been known in the art as excellent adhesives. They have found wide application as industrial and structural adhesives. They have also found wide application in the consumer market for repair of household items and in the hobby sector for assembly and repair. Due to their unique ability to bond living tissue, liquid cyanoacrylate compositions have found application in medicine for closing wounds and incisions, especially in cases where suturing does not provide satisfactory results. Cyanoacrylate compositions have also found life-saving application for embolization of arterio-venous malformations and aneurysms.

One of the major disadvantages for all of the above applications is the low viscosity of the adhesives. Their runniness requires either special dispensing equipment or particular skill and training of the user for their proper administration.

A variety of attempts have been made to overcome the known disadvantages that result from the runniness of cyanoacrylate adhesive compositions. Various polymer additives have been disclosed to adjust the viscosity of cyanoacrylate preparations. In this regard, please refer to U.S. Pat. Nos. 2,765,332; 2,794,788; 3,527,841; 3,282,773; 3,692,752; 3,836,377; 4,038,345; and 4,102,945, the teachings each of which are incorporated by reference in their entirety. The polymer additives discussed, however, have not satisfactorily resolved the runniness related disadvantages since only relatively minor adjustments to the viscosity are achieved and in some cases the proposed additives interfere with the quality of the adhesive bond.

Others have attempted to increase the viscosity of cyanoacrylate adhesive preparations by modifying the cyanoacrylate itself and/or by adding modified cyanoacrylates to the adhesive composition. For example, U.S. Pat. No. 3,564,078 discloses the use of poly (ethyl 2-cyanoacrylate) as a component of cyanoacrylate compositions. However, these compositions have also proven to be unsatisfactory solutions to these problems.

The use of fillers has also been proposed as a method for adjusting the viscosity of cyanoacrylate preparations. According to U.S. Pat. No. 4,105,715, finely divided organic powders such as polycarbonates, polyvinylidene fluorides, polyethylenes, and other polymeric powders are proposed as additives for cyanoacrylates. U.S. Pat. Nos. 3,663,501; 3,607,542; 4,533,422; and Re. 32,889 propose the addition of various inert inorganic materials such as silica, quartz, alumina, calcium and metal salts to cyanoacrylate preparations as fillers. Again, although these additives can form thixotropic compositions, they are generally unsatisfactory to resolve the runniness problem since they provide relatively ineffective adjustments to viscosity and have a tendency to interfere with the quality of the bond.

In addition to runniness, the stability and shelf life of cyanoacrylate adhesive preparations can also be less than optimum, particularly when some of the foregoing additives are used. A series of U.S. patents comprising U.S. Pat. Nos. 5,514,371; 5,514,372; 5,532,867; 5,575,997; 5,582,834; and 6,203,802 describe the inclusion of certain formaldehyde scavengers in the cyanoacrylate composition. These formaldehyde scavengers can be encapsulated in microcapsules comprised of polycaprolactone.

Although the above cited art has suggested methods for altering the viscosity of cyanoacrylate preparations, they have either achieved relatively moderate viscosity increases such that the preparations remain runny or they have created thixotropic cyanoacrylate adhesives which produce less desirable bonding characteristics. Thus, the need remains for a cyanoacrylate adhesive preparation which is not runny and has the excellent bonding characteristics of typical cyanoacrylates. It is an object of this invention to produce cyanoacrylate adhesive compositions which solve the runniness problem while at the same time provide the excellent bonding characteristics of typical cyanoacrylates.

SUMMARY OF THE INVENTION

The current invention provides a cyanoacrylate adhesive composition which is in a new undiscovered form. The adhesives of the present invention are preferably in a solid form at room temperature and below room temperature. Room temperature is considered the interval from about 15° C. to about 37° C., and more preferably from about 15° C. to about 25° C. This makes the application of the adhesive very easy and well controlled. The application is similar to applying other solid non-cyanoacrylate adhesives molded in a stick-shape. Containers similar to the ones used to store and apply solid non-cyanoacrylate adhesives, wherein the adhesives is contained in a stick shape and is controllably pushed out of the container, are deemed suitable for storage and application of the adhesives of the present invention. Rubbing the adhesive of the present invention onto the surface to be coated or bonded deposits the required amount of the adhesive. The adhesive is preferably activated when the temperature of the substrate reaches a temperature above room temperature, which temperature renders the adhesive in liquid form. The liquefied adhesive spreads and wets the underlying substrate surface and can polymerize as a typical cyanoacrylate adhesive. The joint assembly can be made before or after the liquification of the adhesive. Assembly before liquification of the adhesive can be particularly advantageous. The liquidification and polymerization of the adhesive can be induced by bringing the joint to a temperature above room temperature, i.e., to temperature higher than 25° C. and preferably higher than 30° C. Industrially the necessary heating can be achieved by any of the known means of heating by thermal, IR, UV or microwave radiation. In the home repair environment or hobby model building environment the necessary heating can be achieved by simply holding the joint between one's fingers or hands, with body heat being sufficient to liquefy the adhesive and initiate its polymerization. When the adhesive composition of the present invention is used as a coating the same procedure applies as heat generated by contact with the body or by thermal, IR, UV or microwave radiation in industrial applications is used to liquefy the adhesive composition, rendering it easily polymerizable.

These properties of the cyanoacrylate compositions of the present invention make it especially suitable for use in medical applications. After controlled and easy application onto skin or other living soft or hard tissue, the adhesives quickly liquefy and bond the surfaces or form an adhesive coating. Sterilization of these solid cyanoacrylate adhesive compositions, when used in medicine, is advantageous and the method taught in UK Patent GB 2306469 is particularly suitable and is incorporated herein by reference. The solid cyanoacrylate compositions of the present invention can contain a biodegradable or bioabsorbable component. The bioabsorbable cyanoacrylate compositions described in U.S. Pat. No. 6,224,622 are particularly suitable for inclusion into the solid cyanoacrylate adhesives of the present invention, which patent is incorporated herein by reference. Medical applications of the adhesives of the present invention include, but are not limited to, wound closure (including surgical incisions and other wounds), adhesives for medical devices (including implants), sealants and void fillers in human and animal medical application, and embolic agents.

One embodiment of the present invention is directed to a method for making a cyanoacrylate adhesive composition which is in a solid form at room temperature by dissolving into a cyanoacrylate monomer or a mixture of cyanoacrylate monomers one or more solidifying polymers or copolymers at elevated temperature, then leaving the solution for a sufficient period of time at room temperature or below room temperature to form a solid at room temperature. The cyanoacrylate monomers are preferably selected from the group consisting of alkyl 2-cyanoacrylates, alkenyl 2-cyanoacrylates, alkoxyalkyl 2-cyanacrylates, and carboalkoxyalkyl 2-cyanoacrylates. The alkyl group of the one or more cyanoacrylates preferably has 1 to 16 carbon atoms. The solidifying polymer or copolymers is preferably but is not limited to, poly (ε-caprolactone).

Another embodiment is directed to a solid cyanoacrylate adhesive composition made by this method. A further embodiment is directed to a solid cyanoacrylate adhesive composition which forms a bioabsorbable adhesive. Another embodiment is directed to containers suitable for storage and dispensing of the solid cyanoacrylate adhesive composition in this invention. Yet another embodiment of this invention is the method of applying a cyanoacrylate adhesive composition in solid form, liquefying it and curing it to form an adhesive bond or adhesive coating. A further embodiment of the present invention is the use of the solid cyanoacrylate adhesive compositions for joining and coating in industrial, consumer and medical (including surgical) applications. Other embodiments and advantages of the invention are set forth in part in the description which follows, and in part, will be obvious from this description, or may be learned from the practice of the invention.

DESCRIPTION OF THE INVENTION

As embodied and broadly described herein, the present invention is directed to cyanoacrylate adhesive compositions which are in solid form at room temperature, and which combine the versatility and speed of action of cyanoacrylates as adhesives, sealants and coatings with a friendly form for handling and applying the product.

The solid cyanoacrylate adhesive compositions of this invention include a cyanoacrylate component. Typically, and preferably, within such component is at least one cyanoacrylate monomer of the formula

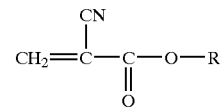

where R represents a C1–16 alkyl, cycloalkyl, alkenyl, alkynyl, cycloalkenyl, alkaryl, aralkyl or aryl group, carbalkoxy alkyl, any of which may be optionally substituted, or interrupted, with non-basic groups, such as oxo, halo, silicone and ether oxygen, provided they do not interfere with the stability and functioning of the monomer as a commercially acceptable adhesive.

For instance, R, may preferably be selected from the group consisting of a methyl, ethyl, n-propyl, isopropyl, n-butyl, isobutyl, pentyl, neo-pentyl, hexyl, n-octyl, 2-octyl, allyl, methallyl, crotyl, propargyl, cyclohexyl, benzyl, phenyl, cresyl, 2-chlorobutyl, trifluorethyl, 2-methoxyethyl, 3-methoxybutyl, 2-ethoxyethyl, and 2-propoxyethyl. Methyl 2-cyanoacrylate, ethyl 2-cyanoacrylate, butyl 2-cyanoacrylate and iso-butyl 2-cyanoacrylate are particularly desirable monomers for use in these inventive compositions. Of course, as stated above, a mixture of two or more of these cyanoacrylate monomers can be used.

The solid cyanoacrylate adhesive compositions of this invention include a polymer or copolymer component which is dissolved in the cyanoacrylate component, and the resultant homogeneous composition is capable of solidifying at or below room temperature, and remains in solid form at room temperature. The exact physical structure of the solid cyanoacrylate compositions of the present invention is not clearly understood at present, but could involve, without implying any restrictions on the scope of the invention, crystallization of the dissolved polymer or copolymer, co-crystallization with the cyanoacrylate monomer, or interaction between the crystallized polymer or copolymer and the cyanoacrylate monomer which immobilizes the monomer, an array of possible amorphous structures below their melting point as well as a combination of amorphous, crystalline and even liquid states.

The solidifying polymer or copolymer component is preferably, but is not limited to, poly (ε-caprolactone) and copolymers of ε-caprolactone with one or more other polymers, containing at least in part the following chemical structure

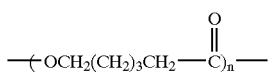

Particularly suitable, commercially available grades of poly (ε-caprolactone) are Tone Polyol P-767-E and Tone Polymer P-767 Pellets, manufactured by Union Carbide, which is now part of Dow Chemical. The concentration of the solidifying polymer(s) and/or co-polymer(s) in the adhesive composition should be sufficient to solidify the overall composition at room temperature and will generally range from about 2% to about 60% by weight of the adhesive composition, but are preferably from about 8% to about 30% by weight of the adhesive composition.

The solid cyanoacrylate adhesives of the present invention may be stabilized against premature polymerization with anionic and free-radical polymerization inhibitors. Anionic polymerization inhibitors known in the art include, but are not limited to, soluble acidic gases (for example sulfur dioxide, sulfur trioxide, hydrogen fluoride), and phosphoric, carboxylic and organic sulphonic acids, and combinations thereof. Free-radical polymerization inhibitors include, but are not limited to, hydroquinone, t-butyl catechol, hydroxyanisole, butylated hydroxyanisole, butylated hydroxytoluene, and p-methoxyphenol.

The solid cyanoacrylate adhesives of the present invention may also contain bio-absorbable monomers, polymers and copolymers. Particularly suitable are copolymers derived from glycolide, lactide, ε-caprolactone, dioxanone and trimethylene carbonate monomers, or copolymers derived from cyanoacrylate monomers and glycolide, lactide, ε-caprolactone, dioxanone or trimethylene carbonate monomers. The compositions and method of preparation of these bio-absorbable materials, as well as their incorporation into a cyanoacrylate adhesive are described in detail in U.S. Pat. No. 6,224,622, which patent is incorporated herein by reference. Therefore, the solid cyanoacrylate adhesives of the present invention can be made bioabsorbable by following the teachings of the above mentioned patent.

The solid cyanoacrylate adhesives of the present invention may further contain any additives necessary to impart desired properties to the adhesives, such as viscosity and thixotropy in liquid state, toughness, surface insensitivity, plasticity, heat resistance, color, smell, and/or X-ray opacity. Suitable thixotropic agents include treated fumed silicas. Suitable viscosity regulators include methylmethacrylate polymers. Suitable tougheners include acrylic elastomers, acrylonitrile copolymer elastomers, fluoro elastomers, graft and block copolymers. Suitable compounds which impart surface insensitivity include crown ethers, sila crown ethers and calixarenes. Suitable plasticizers include esters of dibasic acids such as sebasic, malonic, and phthalic acids. The perfumes, dyes, pigments and X-ray opacifiers used in the compositions should be cyanoacrylate-compatible in order not to adversely affect the stability or performance of the compositions. For example, dyes contemplated for use in the present invention include, but are not limited to, D&C Violet No. 2, D&C Green No. 6, carbon black and bone black.

The adhesives of the present invention may also optionally include anti-microbial agents, antibiotics, growth-promoting factors, anti-cancer drugs, immune system enhancing drugs, and leachable inorganic fillers. For example, growth factors contemplated for use in the adhesives of the present invention include, but are not limited to, fibroblast growth factors, bone growth factors, epidermal growth factors, platelet derived growth factors, macrophage derived growth factors, alveoral derived growth factors, monocyte derived growth factors, magainin, and so forth. Inorganic leachable fillers contemplated for use in the adhesives of the present invention include, but are not limited to, tricalcium phosphate, hydroxyapatite, calcium carbonate, and calcium chloride.

The adhesive compositions of the present invention can be heat sterilized by following the teachings of UK Pat. GB 2306469 (U.S. Pat. No. 6,136,326), which patent is incorporated herein by reference.

The cyanoacrylate adhesive compositions of the present invention, can be prepared, as noted, by dissolving into a cyanoacrylate monomer or a mixture of cyanoacrylate monomers one or more solidifying polymers and copolymers at elevated temperature, and leaving the solution for a pre-determined period of time at room temperature or below room temperature in order to form a solid at room temperature.

Containers suitable for holding and dispensing these cyanoacrylate will preferably be made of a material which is non-reactive with the solid cyanoacrylate composition, like polymers and copolymers of ethylene, propylene, butylene and fluorinated alkenes. The adhesive will be preferably stored in a solid, stick-like shape, and will be dispensed from the container in a controlled way by the action of a screw-type or a plunger-type mechanism. Another suitable package form will be an "adhesive pencil" where the solid cyanoacrylate composition of the present invention is formed into a rod shape and enclosed into a skin of suitable polymer material, like polymers and copolymers, which can be peeled or cut from the adhesive solid.

The cyanoacrylates of this invention should be applied in sold form, then liquefied with heat and cured to form an adhesive bond, adhesive coating or adhesive seal. Rubbing the adhesive of the present invention onto the surface to be coated or bonded deposits the required amount of the adhesive. The adhesive is activated when the temperature of the substrate reaches a temperature above room temperature, which temperature renders the adhesive in liquid form. The liquid adhesive spreads and wets the underlying substrate surface and can polymerize as a typical cyanoacrylate adhesive. The joint assembly can be made before or after the liquidification of the adhesive. Especially advantageous from the point of ease of application is the assembly before the liquification of the adhesive. The liquification and polymerization of the adhesive can be induced by bringing the joint to temperature above room temperature, i.e. to temperature higher than about 25° C. and preferably higher than about 30° C. Industrially this can be achieved by any of the known means of heating by thermal, IR, UV or microwave radiation. In home consumer repair environment or hobby model building environment this can be achieved by simply holding the joint between one's fingers or hands, the body heat being sufficient to liquefy the adhesive and initiate its polymerisation. When the adhesive composition of the present invention is used as a coating the same procedure applies as heat generated by contact with the body or by thermal, IR, UV or microwave radiation in industrial applications is used to liquefy the adhesive composition, which renders it easily polymerizable.

It should be noted that the temperature at which the solid cyanoacrylate compositions of the present invention liquefy can be adjusted to suit the application requirements. This is achieved by varying the ratio of cyanoacrylate monomer(s) to the solidifying polymer(s) and/or copolymer(s) or by adjusting the identity of the solidifying polymer(s) or copolymer(s). The liquefying temperature can be less than room temperature or much higher than room temperature. It can vary from about 10° C. to about 60° C. for most applications and even in a wider range if that is necessary. Preferably the liquefying temperature is in the range of about 30° C. to about 45° C., more preferably from about 20° C. to about 40° C. and most preferably from about 25° C. to about 40° C. Substantially no polymerization of the adhesive occurs until the adhesive composition is liquefied, preferably after application to the substrate.

The properties of the cyanoacrylate compositions of the present invention of the present invention make it especially suitable for use in medical applications. After controlled and easy application onto skin or other living soft or hard tissue, the adhesive quickly liquefies and bonds the surfaces or forms an adhesive coating.

It has been found that the solid cyanoacrylate composition of this invention provide for improved stability and shelf life when compared to liquid, thixotropic or paste cyanoacrylate adhesive compositions. It is not clearly understood, but it is possible, without implying any restrictions on the scope of the invention, that the restricted mobility of the cyanoacrylate molecules in the solid adhesive compositions of the present invention renders the compositions extremely storage stable at room temperature, without any loss of their adhesive properties.

The following examples are offered to illustrate the invention, and should not be viewed as limiting the scope of the invention.

EXAMPLES

Example 1

Commercial ethyl cyanoacrylate monomer, Anacure 3020, available from Chemence Ltd, UK is heated to and maintained at 55–70° C. Under mixing poly (ε-caprolactone), (Tone Polyol P-767-E, Union Carbide)is added in portions until each portion is completely dissolved. The obtained homogeneous solutions are cooled down to room temperature and their viscosity is measured. Surprisingly, after allowing some of the solutions to cool for 24 hours to room temperature they turn into homogeneous solids. Some of these solids when placed between the fingers convert to liquids and quickly bond the skin. Some require higher than body temperature to liquefy and polymerize. The results are summarized in Table 1.

TABLE 1

| No | Composition* | Viscosity at 20° C. | Appearance after 24 h at room temperature | Liquifies at |
|---|---|---|---|---|
| 1 | 100% ECA | 3 cP | Clear liquid | — |
| 2 | 95.24% ECA 4.76% PCL | 100 cP | Clear viscous liquid | — |
| 3 | 91.24% ECA; 8.76% PCL | 220 cP | White, wax-like solid | Body temperature |
| 4 | 85.12% ECA; 14.88% PCL | 840 cP | White, wax-like solid | Body temperature |
| 5 | 80.00% ECA; 20.00% PCL | More than 1000 cP | White, wax-like solid | Body temperature |
| 6 | 70.00% ECA; 30.00% PCL | More than 1000 cP | White, wax-like solid | 40° C. |
| 7 | 50.00% ECA; 50.00% PCL | More than 1000 cP | White, wax-like solid | 43° C. |

*ECA = ethyl 2-cyanoacrylate monomer (Anacure 3020) ((now available as EC5 from Chemence, Inc.))
PCL = poly(e-caprolactone), (Tone Polyol P-767-E, Union Carbide) ((now available as Tone Polymer P-767 from Dow Corporation)).

Example 2

Compositions prepared according to Example 1 are stored in high density polyethylene bottles at room temperature. Their appearance and adhesive performance is measured after given period of time. The results are presented in Table 2.

TABLE 2

| No | Composition* | Appearance after 2 years | Appearance after 4 years | Adhesive properties after 2 years | Adhesive properties after 4 year |
|---|---|---|---|---|---|
| 1 | 100% ECA | Polymerized solid | — | None | — |
| 2 | 91.24% ECA; 8.76% PCL | White, wax-like solid | White, wax-like solid | Retained | Retained |
| 3 | 85.12% ECA; 14.88% PCL | White, wax-like solid | White, wax-like solid | Retained | Retained |
| 4 | 80.00% ECA; 20.00% PCL | White, wax-like solid | White, wax-like solid | Retained | Retained |
| 5 | 70.00% ECA; 30.00% PCL | White, wax-like solid | White, wax-like solid | Retained | Retained |
| 6 | 50.00% ECA; 50.00% PCL | White, wax-like solid | White, wax-like solid | Retained | Retained |

*ECA = ethyl 2-cyanoacrylate monomer (Anacure 3020) ((now available as EC5 from Chemence, Inc.))
PCL = poly(e-caprolactone), (Tone Polyol P-767-E, Union Carbide) ((now available as Tone Polymer P-767 from Dow Corporation)).

*ECA=ethyl 2-cyanoacrylate monomer (Anacure 3020) ((now available as EC5 form Chemence, Inc.))
PCL=poly (ε-caprolactone), (Tone Polyol P-767-E, Union Carbide) (now available as Tone PolymerP-767 from Dow Corporation)).

Other embodiments and uses of the invention will be apparent to those skilled in the art from consideration of the specification and practice of the invention disclosed herein, including all U.S. and foreign patents and patent applications, that are specifically and entirely incorporated by reference. It is intended that the specification and examples be considered exemplary only, with the true scope and spirit of the invention indicated by the following claims.

What is claimed is:

1. An adhesive composition which comprises at least one cyanoacrylate monomer and at least one solidifying polymer, wherein the adhesive composition is capable of polymerizing to form an adhesive polymer and wherein, before such polymerizing, the adhesive composition has a liquifying point within a specified temperature greater than about 20° C. and wherein such polymerizing does not substantially occur until the adhesive composition is liquefied, wherein said adhesive composition is in solid form at room temperature and said solidifying polymer is a homopolymer having the following structural formula:

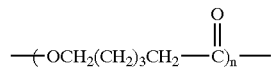

wherein n is an integer.

2. A composition according to claim 1 wherein the specified temperature range is from about 25° C. to about 45° C.

3. A adhesive composition according to claim 1 wherein the solidifying polymer is ε-caprolactone.

4. A composition according to claim 1 wherein the cyanoacrylate monomer has the following structural formula:

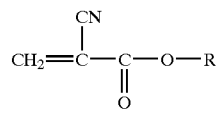

where R represents a substituted or unsubstituted constituent group selected from the group consisting of alkyl, cycloalkyl, alkenyl, alkynyl, cycloalkenyl, alkaryl, aralkyl, aryl, and carbalkoxy alkyl groups.

5. A composition according to claim 4 wherein R is selected from the group consisting of methyl, ethyl, n-propyl, isopropyl, n-butyl, isobutyl, pentyl, neo-pentyl, hexyl, n-octyl, allyl, methallyl, crotyl, propargyl, cyclohexyl, benzyl, phenyl, cresyl, 2-chlorobutyl, trifluoroethyl, 2-methoxyethyl, 3-methoxybutyl, 2-ethoxy ethyl and 2-propoxethyl.

6. A composition according to claim 4 wherein the cyanoacrylate monomer is selected from the group consisting of methyl 2-cyanoacrylate, ethyl 2-cyanoacrylate, butyl 2-cyanoacrylate, and isobutyl 2-cyanoacrylate.

7. A composition according to claim 4 wherein the solidifying polymer is (ε-caprolactone).

8. A composition according to claim 1 wherein the composition also solidifying a bio-absorbable material selected from the group consisting of monomers or oligomers of glycolides, lactides, ε-caprolactones, dixoanone, trimethylene carbonates, and copolymers of any of the foregoing with cyanoacrylates.

9. A composition according to claim 1 wherein the composition also comprises an additive selected form the group consisting of acrylates, methacrylates, acrylonitrile copolymers, crown ethers, sila crown ethers, calizarenes, esters of diabasic acids, perfumes, dyes, pigments, x-ray opacifiers, antimicrobial agents, antibiotics, growth promoting factors, drugs and fillers.

10. A method for adhering two or more surfaces together, said method comprising:
a) applying to at least one surface an adhesive composition which comprises at least one cyanoacrylate monomer and at least one solidifying polymer, wherein the adhesive composition is applied to said at least one surface in a solid form to create a layer of the adhesive composition on said at least one surface, wherein the adhesive composition is capable of polymerizing to form an adhesive polymer, and such polymerizing does not substantially occur until the adhesive composition is liquefied;
b) bringing the surfaces to be adhered into contact with each other such that the layer of adhesive composition is between the surfaces to be adhered; and
c) heating the layer of the adhesive composition such that the layer liquefies and polymerizes into an adhesive polymer wherein said adhesive composition is in solid form at room temperature and said solidifying polymer is a homopolymer having the following structural formula:

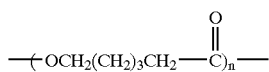

wherein n is an integer.

11. A method of claim 10 wherein the solidifying polymer is (ε-caprolactone).

12. A method according to claim 10 wherein the adhesive composition liquefies at a temperature greater than about 20° C.

13. A method according to claim 10 wherein the cyanoacrylate monomer has the following structural formula:

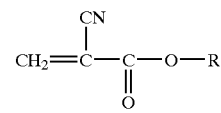

where R represents a substituted or unsubstituted constituent group selected from the group consisting of alkyl, cycloalkyl, alkenyl, alkynyl, cycloalkenyl, alkaryl, aralkyl, aryl, and carbalkoxy alkyl groups.

14. A method according to claim 10 wherein R is selected from the group consisting of methyl, ethyl, n-propyl, isopropyl, n-butyl, isobutyl, pentyl, neo-pentyl, hexyl, n-octyl, allyl, methallyl, crotyl, propargyl, cyclohexyl, benzyl, phenyl, cresyl, 2-chlorobutyl, trifluoroethyl, 2-methoxyethyl, 3-methoxybutyl, 2-ethoxy ethyl and 2-propoxyethyl.

15. A method according to claim 10 wherein the cyanoacrylate monomer is selected from the group consisting of methyl 2-cyanoacrylate, ethyl 2-cyanoacrylate, butyl 2-cyanoacrylate, and isobutyl 2-cyanoacrylate.

16. A method according to claim 10 wherein the solidifying polymer is (ε-caprolactone).

17. A method for coating a substrate with an adhesive coating, said method comprising:
a) according to said substrate an adhesive composition which comprises at least one cyanoacrylate monomer and at least one solidifying polymer, wherein the adhesive composition is applied to said substrate in a solid form to create a layer of the adhesive composition on said substrate, wherein the adhesive composition is capable of polymerizing to form an adhesive polymer, and wherein such polymerizing does not substantially occur until the adhesive composition is liquefied; and
b) applying heat to the layer of the adhesive composition such that the layer liquefies and polymerizes into an adhesive polymer wherein said adhesive composition is in solid form at room temperature and said solidifying polymer is a homopolymer having the following structural formula:

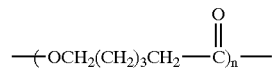

wherein n is an integer.

18. The method of claim 17 wherein the solidifying polymer is ε-caprolactone.

19. A method according to claim 17 wherein the adhesive composition liquefies at a temperature greater than about 20° C.

20. A method according to claim 17 wherein the cyanoacrylate monomer has the following structural formula:

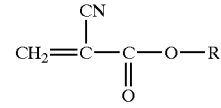

where R represents a substituted or unsubstituted constituent group selected from the group consisting of alkyl, cycloalkyl, alkenyl, alkynyl, cycloalkenyl, alkaryl, aralkyl, aryl, and carbalkoxy alkyl groups.

* * * * *

UNITED STATES PATENT AND TRADEMARK OFFICE
CERTIFICATE OF CORRECTION

PATENT NO. : 6,797,107 B1
DATED : September 28, 2004
INVENTOR(S) : Kotzev, Dimiter L.

It is certified that error appears in the above-identified patent and that said Letters Patent is hereby corrected as shown below:

Column 1,
Line 26, after "bringing" delete "the".

Column 3,
Line 6, change "liquidification" to -- liquification --.
Line 52, change "2-cyanacrylates" to -- 2-cyanoacrylates --.

Column 6,
Line 39, change "liquidification" to -- liquification --.

Column 7,
Line 9, after "invention" delete "of the present invention".

Column 8,
Line 26, after "EC5" change "form" to -- from --.

Signed and Sealed this

Twenty-sixth Day of April, 2005

JON W. DUDAS
*Director of the United States Patent and Trademark Office*